United States Patent
Hummel et al.

(10) Patent No.: US 10,087,099 B2
(45) Date of Patent: Oct. 2, 2018

(54) METHOD FOR PRODUCING BLANKS FOR SINTERED GLASS BODIES FOR GLASS SEALS

(71) Applicant: IL Metronic Sensortechnik GmbH, Ilmenau-Unterpoerlitz (DE)

(72) Inventors: Wolf-Joachim Hummel, Ilmenau (DE); Katja Nicolai, Ilmenau (DE)

(73) Assignee: IL Metronic Sensortechnik GmbH, Ilmenau-Unterpörlitz (DE)

( * ) Notice: Subject to any disclaimer, the term of this patent is extended or adjusted under 35 U.S.C. 154(b) by 224 days.

(21) Appl. No.: 15/221,970

(22) Filed: Jul. 28, 2016

(65) Prior Publication Data

US 2017/0029312 A1 Feb. 2, 2017

(30) Foreign Application Priority Data

Jul. 28, 2015 (DE) ........................ 10 2015 112 299

(51) Int. Cl.
| | | |
|---|---|---|
| *B29C 71/02* | (2006.01) | |
| *C03C 3/083* | (2006.01) | |
| *C03C 3/085* | (2006.01) | |
| *C03C 3/087* | (2006.01) | |
| *C03C 3/089* | (2006.01) | |
| *C03C 3/102* | (2006.01) | |
| *C03C 3/105* | (2006.01) | |
| *C03B 19/01* | (2006.01) | |
| *B29C 64/188* | (2017.01) | |
| *B29C 64/165* | (2017.01) | |
| *C03C 3/091* | (2006.01) | |
| *C03C 8/16* | (2006.01) | |
| *C03B 19/06* | (2006.01) | |
| *B33Y 10/00* | (2015.01) | |
| *B33Y 70/00* | (2015.01) | |
| *C03C 3/108* | (2006.01) | |

(52) U.S. Cl.
CPC ............ *C03B 19/01* (2013.01); *B29C 64/165* (2017.08); *B29C 64/188* (2017.08); *B33Y 10/00* (2014.12); *B33Y 70/00* (2014.12); *C03B 19/06* (2013.01); *C03C 3/091* (2013.01); *C03C 3/108* (2013.01); *C03C 8/16* (2013.01)

(58) Field of Classification Search
CPC . B29C 64/165; B29C 64/188; B29C 67/0081; B29C 71/02; B33Y 10/00; B33Y 70/00; C03B 19/01; C03B 19/06; C03C 3/083; C03C 3/085; C03C 3/087; C03C 3/089; C03C 3/091; C03C 3/102; C03C 3/105; C03C 3/108
USPC .......... 264/113, 123, 124, 125, 128; 65/17.3
See application file for complete search history.

(56) References Cited

U.S. PATENT DOCUMENTS

| | | | |
|---|---|---|---|
| 5,204,055 A | 4/1993 | Sachs et al. | |
| 7,141,207 B2 | 11/2006 | Jandeska, Jr. et al. | |
| 9,464,874 B1 * | 10/2016 | Mohler | F42B 3/10 |
| 2018/0104793 A1 * | 4/2018 | Franke | B24D 5/02 |

FOREIGN PATENT DOCUMENTS

| | | |
|---|---|---|
| AU | 2013340896 A2 | 5/2015 |
| DE | 11 2005 002 040 T5 | 7/2007 |
| WO | WO 2014/067990 A1 | 5/2014 |

* cited by examiner

*Primary Examiner* — Leo B Tentoni
(74) *Attorney, Agent, or Firm* — Muncy, Geissler, Olds & Lowe, P.C.

(57) ABSTRACT

A method for the production of blanks for sintered glass bodies for glass seals, wherein with a 3D printing method, a number of layers are arranged one above the other. In a first step, a first layer of a glass powder is spread on a surface, a computer-controlled stream of a printing fluid is directed to selected areas of the first layer in a pattern prescribed by the computer. In a second step, a further layer of the glass powder is spread over the first layer and on it, a computer-controlled stream of printing fluid is directed to selected surfaces of the second layer in a pattern prescribed by the computer, the two steps are repeated until the blank is formed. The glass powder components contain $SiO_2$, $Na_2O$, $K_2O$, $CaO$, $MgO$, $B_2O_3$, $BaO$, $Al_2O_3$, $PbO$, $Li_2O$ and $SrO$ as well as a solid binder made of dextrin.

3 Claims, 1 Drawing Sheet

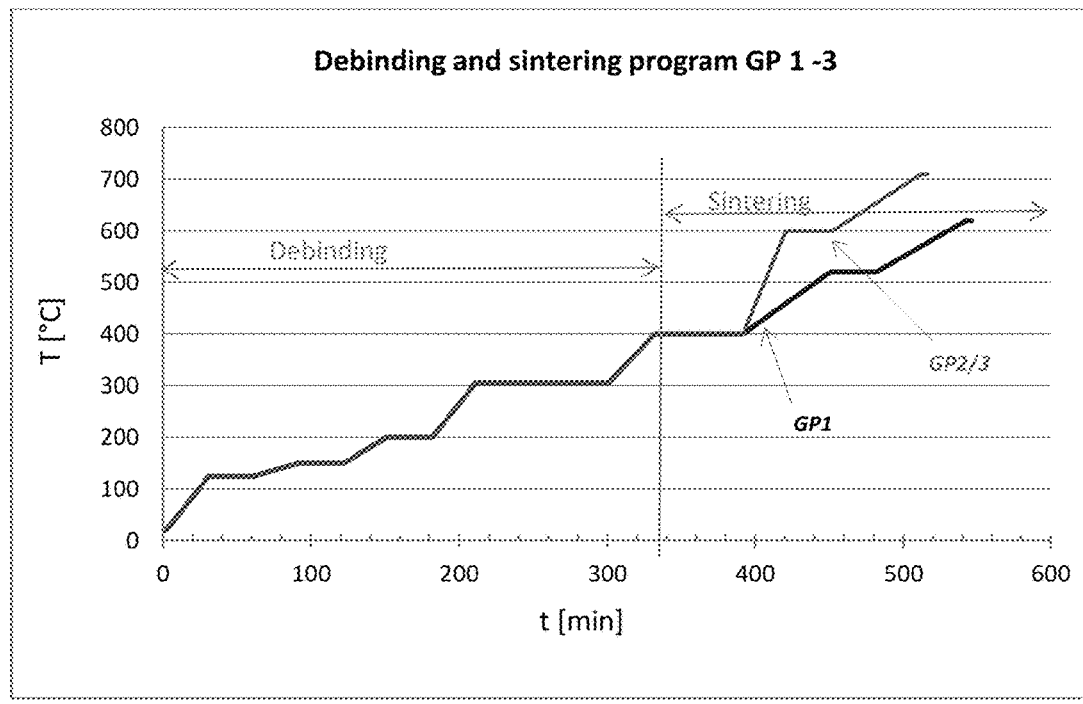
Debinding and sintering program glasspowder GP1-3

METHOD FOR PRODUCING BLANKS FOR SINTERED GLASS BODIES FOR GLASS SEALS

This nonprovisional application claims priority under 35 U.S.C. § 119(a) to German Patent Application No. 10 2015 112 299.5, which was filed in Germany on Jul. 28, 2015, and which is herein incorporated by reference.

BACKGROUND OF THE INVENTION

Field of the Invention

The invention relates to a method for the production of blanks for sintered glass bodies for glass seals, in which a number of layers are arranged one above the other in a 3D printing process, wherein in a first step, a first layer of a glass powder is spread on a surface, a computer-controlled stream of a printing fluid is directed to selected areas of the first layer in a pattern prescribed by the computer, in a second step, a further layer of the glass powder is spread over the first layer and on it, a computer-controlled stream of printing fluid is directed in a pattern prescribed by the computer to selected surfaces of the second layer and the two steps are repeated until the blank is formed.

Description of the Background Art

Blanks for sintered glass bodies for glass seals are typically understood to be bodies which through sintering produce a glass body needed for sealing. Such glass bodies are needed in particular for glass seals, in which metallic conductors are secured by glass fuse seals or glass solder in a metal outer body. It may be necessary to produce accurate glass body structures with more than 100 sealed inner conductors.

With the known methods, the glass bodies are produced by a printing method in which a glass granulate offset with a binding agent is printed to form a blank for sintered glass bodies with tools specially prepared for this mold. The production of such tools entails high costs and long development times. Furthermore, only certain geometric shapes can be produced.

For special and high-precision production of complex components, 3D printing is increasingly used.

From U.S. Pat. No. 5,204,055 A it is already known to provide 3D printing methods for the production of workpieces with powder as a raw material, wherein a plurality of layers is stacked from the bottom up.

Further, in DE 11 2005 002 040 T5, which corresponds to U.S. Pat. No. 7,141,207, a method for the production of articles made of aluminum and magnesium is described. Prototypes for automotive parts are manufactured therewith.

WO 2014/067990 A1 describes a method for producing a ceramic green body in which on a substrate, a layer is formed that contains a ceramic, glass ceramic or glass powder. A hardening composition with a solvent or dispersing agent is applied to a part of the layer. These steps are repeated at least once, removing the solvent or dispersant partially or completely by forming a green body. The unbound ceramic powder is also removed, leaving the green body exposed.

Glass seals must meet specific requirements, in particular a low porosity, that are not achieved with the known methods.

SUMMARY OF THE INVENTION

It is therefore an object of the invention to provide a method for producing blanks for glass seals, which differs in terms of lower costs and the expansion of the geometries from the previous methods.

BRIEF DESCRIPTION OF THE DRAWING

The present invention will become more fully understood from the detailed description given hereinbelow and the accompanying drawing which is given by way of illustration only, and thus, is not limitive of the present invention, and wherein the sole FIGURE illustrates the debinding and sintering regime for three different glass powders.

DETAILED DESCRIPTION

In an exemplary embodiment, blanks for sintered glass bodies for glass seals are produced with a 3D powder bed printing process by stacking a number of layers. First, a layer of glass powder is applied, which is fixed with a printing fluid. Subsequently, the next layer is applied and fixed, until the blank is finished.

The glass powder has components of $SiO_2$, $Na_2O$, $K_2O$, CaO, MgO, $B_2O_3$, BaO, $Al_2O_3$, PbO, $Li_2O$ and SrO and contains a solid binder made of dextrin. The glass powder has a particle size distribution with a maximum particle size of 165 microns. The printing fluid has an aqueous solution of a polymer 2-pyrrolidone.

The binder system used for the preparation of the blanks includes two components, a solid component and a liquid component. The solid component is formed by dextrin introduced into the glass powder. The liquid component is located in the printing fluid in the form of an aqueous solution of the polymer 2-pyrrolidone (2-Py). To wet a volume element (voxel) with the dimensions of 250 microns×250 microns×250 microns, a 2Py amount between 6-10 micrograms is required at atmospheric pressure (1.013 bar), which is ensured by the print head.

For optimum packing density of the glass powder and low porosity of the sintered glass body used for the glass seal, a special particle size distribution of the glass powder is required.

An advantageous embodiment of the method results from the fact that the components of the glass powder having the following composition in mass %:
  $SiO_2$: 60 to 70, preferably 62 to 70, in particular 64.2
  $Na_2O$: 6 to 9, preferably 7 to 7.5, in particular 7.18
  $K_2O$: 5.5 to 7.5, preferably 6 to 6.5, in particular 6.35
  CaO: 0.1 to 0.8, preferably 0.2 to 0.4, in particular 0.36
  MgO: 0.1 to 0.6, preferably 0.1 to 0.2, in particular 0.14
  $B_2O_3$: 1.5 to 3.5, preferably 2.5 to 3, in particular 2.84
  BaO: 10 to 20, preferably 13 to 14, in particular 13.8
  $Al_2O_3$: 1.5 to 3.5, preferably 2 to 3, in particular 2.36
  PbO: 0.005 to 0.02, preferably 0.005 to 0.01, in particular 0.01
  $Li_2O$: 2.0 to 3.5, preferably 7 to 7.5, in particular 2.57
  SrO: 0.1 to 0.6, preferably 0.1 to 0.2, in particular 0.13,
  wherein the sum of the components is 100%,
  and the particle size distribution of the glass powder has an initial screening with the size fractions being
  0.5 to 1.5%, preferably 1% <88 microns
  0.1 to 1.0%, preferably 0.5% <78 microns
  4.0 to 8.0%, preferably 6% <30 microns
  12 to 20%, preferably 18% <20 microns
  35 to 70%, preferably 64% <5 microns wherein the sum of the components is 100%.

Blanks thus produced are particularly suitable for further processing in printed glass seals. In these embodiments, the expansion coefficient of the glass is lower than that of the metallic outer ring.

A further advantageous embodiment of the method provides that the components of the glass powder have the following composition in mass %:

$SiO_2$: 55 to 75, preferably 60 to 70, in particular 65
$Na_2O$ and/or $K_2O$: 1.5 to 4, preferably 2 to 3
$Al_2O_3$: 6 to 10, preferably 7 to 9, in particular 8
CaO and/or MgO and/or BaO: 1 to 5, preferably 2 to 4, in particular 3
$B_2O_3$: 15 to 24, preferably 16 to 20, in particular 18
wherein the sum of the components is 100%,
and the particle size distribution of the glass powder has an initial screening with the size fractions being
0.5 to 1.5%, preferably 1% <149 micron
1.0 to 3.0%, preferably 2% <78 microns
6.0 to 10.0%, preferably 8% <30 microns
15 to 25%, preferably 21% <20 microns
50 to 70%, preferably 61% <5 microns
wherein the sum of the components is 100%.

Such blanks are particularly suitable for further processing in components made of materials with a low coefficient of expansion, for example of Kovar, an alloy of 54% iron, 29% nickel, 17% cobalt.

A further advantageous embodiment of the method is that the components of the glass powder having the following composition in mass %:

$SiO_2$: 60 to 90, preferably 70 to 80,
$Na_2O$ and/or $K_2O$: 2 to 10, preferably 4 to 8,
$Al_2O_3$: 1 to 10, preferably 2 to 7,
CaO and/or MgO and/or BaO: 0 to 10, preferably 0 to 5,
$B_2O_3$: 5 to 20, preferably 7 to 13,
wherein the sum of the components is 100%,
and the particle size distribution of the glass powder has an initial screening with the size fractions being
0.1 to 0.8%, preferably 0.5% <165 micron
1.5 to 3.0%, preferably 2% <78 microns
30 to 40%, preferably 36% <20 microns
25 to 40%, preferably 35% <5 microns
wherein the sum of the components is 100%.

In a further exemplary embodiment of the method it is provided that the blank is subjected to a stepwise debinding process after printing, and then sintered. This combined process includes the stepwise binder burnout and sintering of the glass. The temperature levels are determined based on the thermogravimetric (TG) curves and the physical properties of the glass such as transformation point, annealing point and softening point.

The breakpoints and holding stages (advantageously six holding stages) of the debinding process are due to the complex processes of binder decomposition. The organic additives must be driven out as evenly as possible and completely out of the blank prior to the actual sintering process because carbon residues during the subsequent melting process can cause cracks and through pores or the so-called "foam glass". The temperatures for the debinding process lie between approximately 100-400° C.

An exemplary embodiment of the invention is explained below.

For additive manufacturing of a sintered glass body with 40 tunnels (non-printed areas), the blanks are made with a 3D printer using a special control software. The underlying 3D geometry data is generated by means of CAD software.

The glass powder is filled into the reservoir of the printer and lightly compacted. After completion of the printing operation, a shell with silica beads is placed in the printing chamber to accelerate the drying of the blanks, which are left in the powder bed for about 48 h. After removal, they are freed from excess powder and left in the cleaning station for another 48 h. The finishing requires, in particular with the tunnels, a methodical approach by blowing out with compressed air and possibly by light spot drilling or puncturing with special hand drilling. This procedure is due to the capillary action of the binder system, which spreads in a small degree to the non-printed areas.

Subsequently, the debinding and sintering process can be performed. In this case, the debinding process is carried out at temperatures of 100 to 400° C. and the sintering process at a maximum temperature of 700° C., preferably at a maximum of 670° C.

The sole FIGURE illustrates the debinding and sintering regime for three different glass powders GP1, GP2 and GP3.

Whereby Entbindern means debinding and Sintern means sintering.

Thereafter, the glass seal can be mounted with a rotary part and with inner conductors.

With thus prepared glass seals, the following parameters were achieved:

Vacuum tightness: $10^{-9}$ mbar*l/s
Insulation resistance: <$10^{11}\Omega$ at 1000 V
Pressure test: resistance up to 400 bar.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing blanks for sintered glass bodies for glass seals in which with a 3D printing method, a plurality of layers are arranged one above the other, the method comprising:
spreading, in a first step, a first layer of a glass powder a surface;
directing a computer-controlled stream of a printing fluid to selected areas of the first layer in a pattern prescribed by the computer;
spreading, in a second step, a further layer of the glass powder over the first layer;
directing a computer-controlled stream of printing fluid to selected surfaces of the second layer in a pattern prescribed by the computer; and
repeating the first and second steps until the blank is formed,
wherein the glass powder contains components of $SiO_2$, $Na_2O$, $K_2O$, CaO, MgO, $B_2O_3$, BaO, $Al_2O_3$, PbO, $Li_2O$ and SrO and a solid binder made of dextrin,
wherein the glass powder has a particle size distribution with a maximum particle size of 165 microns,
wherein the printing fluid is made of an aqueous solution of a polymer 2-pyrrolidone,
wherein the components of the glass powder have the following composition in mass %:
$SiO_2$: 60 to 70, 62 to 70, or 64.2,
$Na_2O$: 6 to 9, 7 to 7.5, or 7.18,
$K_2O$: 5.5 to 7.5, 6 to 6.5, or 6.35,
CaO: 0.1 to 0.8, 0.2 to 0.4, or 0.36,
MgO: 0.1 to 0.6, 0.1 to 0.2, or 0.14,
$B_2O_3$: 1.5 to 3.5, 2.5 to 3, or 2.84,
BaO: 10 to 20, 13 to 14, or 13.8, Al$_2$O$_3$ 1.5 to 3.5, 2 to 3, or 2.36,
PbO: 0.005 to 0.02, 0.005 to 0.01, or 0.01,
Li$_2$O: 2.0 to 3.5, 7 to 7.5, or 2.57,
SrO: 0.1 to 0.6, 0.1 to 0.2, or 0.13,
wherein the sum of the components is 100%,
wherein a particle size distribution of the glass powder has an initial screening with size fractions being:
0.5 to 1.5%, or 1%, and <88 microns,
0.1 to 1.0%, or 0.5%, and <78 microns,
4.0 to 8.0%, or 6%, and <30 microns,
12 to 20%, or 18%, and <20 microns,
35 to 70%, or 64%, and <5 microns, and
wherein the sum of the components is 100%.

2. A method for producing blanks for sintered glass bodies for glass seals in which with a 3D printing method, a plurality of layers are arranged one above the other, the method comprising:
spreading, in a first step, a first layer of a glass powder a surface;
directing a computer-controlled stream of a printing fluid to selected areas of the first layer in a pattern prescribed by the computer;
spreading, in a second step, a further layer of the glass powder over the first layer;
directing a computer-controlled stream of printing fluid to selected surfaces of the second layer in a pattern prescribed by the computer; and
repeating the first and second steps until the blank is formed,
wherein the glass powder contains components of SiO$_2$, Na$_2$O, K$_2$O, CaO, MgO, B$_2$O$_3$, BaO, Al$_2$O$_3$, PbO, Li$_2$O and SrO and a solid binder made of dextrin,
wherein the glass powder has a particle size distribution with a maximum particle size of 165 microns,
wherein the printing fluid is made of an aqueous solution of a polymer 2-pyrrolidone,
wherein the components of the glass powder have the following composition in mass %:
SiO$_2$: 55 to 75, 60 to 70, or 65,
Na$_2$O and/or K$_2$O: 1.5 to 4, or 2 to 3,
Al$_2$O$_3$: 6 to 10, 7 to 9, or 8,
CaO and/or MgO and/or BaO: 1 to 5, 2 to 4, or 3,
B$_2$O$_3$: 15 to 24, 16 to 20, or 18,
wherein the sum of the components is 100%,
wherein the particle size distribution of the glass powder has an initial screening with the size fractions being
0.5 to 1.5%, or 1%, and <149 microns,
1.0 to 3.0%, or 2%, and <78 microns,
6.0 to 10.0%, or 8%, and <30 microns,
15 to 25%, or 21%, and <20 microns,
50 to 70%, or 61%, and <5 microns, and
wherein the sum of the components is 100%.

3. A method for producing blanks for sintered glass bodies for glass seals in which with a 3D printing method, a plurality of layers are arranged one above the other, the method comprising:
spreading, in a first step, a first layer of a glass powder a surface;
directing a computer-controlled stream of a printing fluid to selected areas of the first layer in a pattern prescribed by the computer;
spreading, in a second step, a further layer of the glass powder over the first layer;
directing a computer-controlled stream of printing fluid to selected surfaces of the second layer in a pattern prescribed by the computer; and
repeating the first and second steps until the blank is formed,
wherein the glass powder contains components of SiO$_2$, Na$_2$O, K$_2$O, CaO, MgO, B$_2$O$_3$, BaO, Al$_2$O$_3$, PbO, Li$_2$O and SrO and a solid binder made of dextrin,
wherein the glass powder has a particle size distribution with a maximum particle size of 165 microns,
wherein the printing fluid is made of an aqueous solution of a polymer 2-pyrrolidone,
wherein the components of the glass powder have the following composition in mass %:
SiO$_2$: 60 to 90, or 70 to 80,
Na$_2$O/K$_2$O: 2 to 10, or 4 to 8,
Al$_2$O$_3$: 1 to 10, or 2 to 7,
CaO/MgO/BaO: 0 to 10, or 0 to 5,
B$_2$O$_3$: 5 to 20, or 7 to 13,
wherein the sum of the components is 100%,
wherein the particle size distribution of the glass powder has an initial screening with the size fractions being:
0.1 to 0.8%, or 0.5%, and <165 microns,
1.5 to 3.0%, or 2%, and <78 microns,
30 to 40%, or 36%, and <20 microns,
25 to 40%, or 35%, and <5 microns, and
wherein the sum of the components is 100%.

* * * * *